(12) United States Patent
Chiruvolu et al.

(10) Patent No.: US 7,372,814 B1
(45) Date of Patent: May 13, 2008

(54) NETWORK SYSTEM WITH COLOR-AWARE UPSTREAM SWITCH TRANSMISSION RATE CONTROL IN RESPONSE TO DOWNSTREAM SWITCH TRAFFIC BUFFERING

(75) Inventors: Girish Chiruvolu, Plano, TX (US); An Ge, Plano, TX (US)

(73) Assignee: Alcatel-Lucent, Paris (FR)

( * ) Notice: Subject to any disclaimer, the term of this patent is extended or adjusted under 35 U.S.C. 154(b) by 925 days.

(21) Appl. No.: 10/715,748

(22) Filed: Nov. 18, 2003

Related U.S. Application Data (60) Provisional application No. 60/450,486, filed on Feb. 27, 2003.

(51) Int. Cl.
*H04L 12/26* (2006.01)
*H04L 12/56* (2006.01)

(52) U.S. Cl. ...................... 370/235; 370/412
(58) Field of Classification Search ............ None
See application file for complete search history.

(56) References Cited

U.S. PATENT DOCUMENTS

| | | | | |
|---|---|---|---|---|
| 5,784,358 | A * | 7/1998 | Smith et al. | 370/230 |
| 6,118,761 | A * | 9/2000 | Kalkunte et al. | 370/229 |
| 6,167,030 | A * | 12/2000 | Kilkki et al. | 370/236 |
| 6,192,029 | B1 * | 2/2001 | Averbuch et al. | 370/229 |
| 6,438,138 | B1 * | 8/2002 | Kamiya | 370/468 |
| 6,526,022 | B1 * | 2/2003 | Chiu et al. | 370/229 |
| 6,690,645 | B1 * | 4/2004 | Aweya et al. | 370/230 |
| 6,724,776 | B1 * | 4/2004 | Jeffries | 370/468 |
| 7,139,281 | B1 * | 11/2006 | Bodin | 370/412 |
| 7,190,669 | B2 * | 3/2007 | Banerjee | 370/229 |
| 2003/0165148 | A1 * | 9/2003 | Bishard | 370/412 |

OTHER PUBLICATIONS

S.Blake:D.Black:M.Carlson:E.Davies:Z.Wang:W.Weiss: An Architecture for Differentiated Services; Dec. 1998;pp. 1-36;Network Working Group.
W. Fang: N. Seddigh: B.Nandy: A Time Sliding Window Three Colour Marker (TSWTOM); Jun. 2000; Network Working Group; pp. 1-9.
W. Noureddine, F. Tobagi: Selective Back-Presuure In Switched Ethernet LANs; Global Telecommunications Conference—Glovecom'99; pp. 1256-1263; High Speed Networks.

* cited by examiner

*Primary Examiner*—Wing Chan
*Assistant Examiner*—Gregory B. Sefcheck (57) ABSTRACT

A network system (10). The system comprises a first network node ($N_6$), and the node comprises an input ($30_{IN}$) for receiving packets. During operation, the first network node operates as a downstream node when receiving packets at the input from an upstream node ($N_5$). The node also comprises a buffer (30), coupled to the input and for storing received packets, and circuitry (32) for detecting when a number of packets stored in the buffer exceeds a buffer storage threshold. The node also comprises circuitry (32), responsive to a detection by the circuitry for detecting that the number of packets stored in the buffer exceeds the buffer storage threshold, for issuing a message to the upstream node. The message selectively commands the upstream node to reduce a rate of transmission of packets from the upstream node to the downstream node to a non-zero rate.

34 Claims, 2 Drawing Sheets

NETWORK SYSTEM WITH COLOR-AWARE UPSTREAM SWITCH TRANSMISSION RATE CONTROL IN RESPONSE TO DOWNSTREAM SWITCH TRAFFIC BUFFERING

CROSS-REFERENCES TO RELATED APPLICATIONS

This application claims priority, under 35 U.S.C. §119, of U.S. Provisional Application No. 60/450,486, filed Feb. 27, 2003, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a network system in which the upstream switch transmission rate is controlled in response to traffic buffering in the adjacent downstream switch.

Ethernet networks are one type of network that has found favor in various applications in the networking industry and for various reasons. For example, Ethernet is a widely used and cost effective medium, with numerous interfaces, and capable of communications and various speeds up to the Gbps range. Ethernet networks may be used to form a Metro Ethernet network, which is generally a publicly accessible network that provides a Metro domain, typically under the control of a single administrator, such as an Internet Service Provider ("ISP"). Metro Ethernet may be used to connect to the global Internet and to connect between geographically separated sites, such as between different locations of a business entity.

An Ethernet network includes various nodes for transporting traffic among the network, where such nodes include what are referred to in the art as switches or routers, where for sake of consistency in this document are hereafter only referred to as switches or switch nodes, while one skilled in the art will appreciate that such switching functionality may be employed in other network devices. The switches implement known techniques for servicing traffic that arrives from different nodes and for minimizing transient (i.e., short term) congestion at any of the nodes. The IEEE 802.3x is the IEEE standard on congestion control. Under IEEE 802.3x, and in the event of congestion in a buffer corresponding to a switch input port, the switch provides "backpressure" by sending a pause message to any directly upstream Ethernet switch that has an output port that is transmitting to the input port that has developed the congestion. Such congestion is detected by a switch in response to its buffering system reaching a threshold, where once that threshold is reached and without intervention, the switch becomes unable to properly communicate its buffered packets onward to the link extending outward from that switch. In response to receiving the pause message, the upstream adjacent switch is thereby commanded to cease the transmission of data to the congested switch for a period of time specified in the pause message, thereby permitting the congested switch additional time to relieve its congested state by servicing the then-stored data in its buffering system. However, because IEEE 802.3x is a non-selective back-pressure congestion control, all the traffic aggregates passing through the congested link get paused irrespective of their ongoing traffic rates. This results in unfairness, as non-aggressive sessions also get penalized along with aggressive sessions.

Another approach also has been suggested for responding to congestion in Metro Ethernet networks. In "Selective Backpressure in Switched Ethernet LANs", by W. Noureddine and F. Tobagi, published by Globecom 99, pp. 1256-1263, and hereby incorporated herein by reference, packets directed to a same Metro Ethernet network destination MAC address are stored in a specific output buffer within a node. When the packet occupancy within such a buffer reaches a threshold limit, backpressure is applied to all the adjacent upstream nodes that have a buffer containing packets of that corresponding MAC destination. However, such an approach has drawbacks. For example, the approach is non-scalable, as there should be n number of buffers (or buffer space) in a node that switches traffic to n different MAC destinations. The number of buffers required also increases when traffic-class is introduced. Also if one of the buffers is not optimally utilized, other traffic with a different MAC destination is not able to utilize the unused resources in the sub-optimal buffer(s), thereby leading to wastage. Further, each session capacity requirement and path can vary with time as well as network condition and, hence, there is no provision for local Max-Min fairness.

Two additional documents also suggest response to congestion in Metro Ethernet networks. Specifically, in "A Simple Technique That Prevents Packet Loss and Deadlocks in Gigabit Ethernet", by M. Karol, D. Lee, S. J. Golestani, published by ISCOM 99, pp. 26-30, and in "Prevention of Deadlocks and Livelocks in Lossless, Backpressure Packet Networks", by M. Karol, S. J. Golestani, D. Lee, and published by INFOCOM 2000, pp. 1333-1342, and hereby incorporated herein by reference, a buffer is described that is shared by more than one session, where a session is defined as a packet or packets communicated between a same ingress and egress Metro Ethernet network edge node (i.e., as identifiable by the addresses in the MAC-in-MAC addressing scheme used for Metro Ethernet networks). The buffer is divided into segments and each segment is given an identification number. Each segment is allowed to store packets with different MAC addresses at the same time, but an arriving packet can only be stored in a segment that currently has packets with the same MAC addresses. If a segment fills to its limit, the node disallows any arriving packets from being stored not only in the congested segment but also other segments whose identification number is smaller than the congested one. At the same time, a backpressure message is sent to every adjacent upstream node. The upstream-nodes will then temporarily stop serving all buffer segments that have identification number similar or smaller than the downstream congested-node segment. Thus, the upstream node is prevented not only from transmitting to the segment that was filled, but also to other segments as well (i.e., those with a smaller identification code). These segments also will be temporarily prevented from accepting any arriving packets. These approaches do not therefore provide for fairness.

In addition to the limitations of the approaches noted above, it has been observed in connection with the preferred embodiments that congestion response at the Ethernet layer may be further improved with consideration of traffic qualifiers at a different network layer. In particular, under the International Standard Organization's Open System Interconnect ("ISO/OSI") model, there are seven network layers. Layer 2 of the ISO describes the data link which includes the logical connections to a network packet destination, using a network interface which includes the Ethernet interface and the concept of Ethernet addresses. The Ethernet address is a 48-bit address, often referred to as a Media Access Control ("MAC") address. Thus, each Ethernet device has a unique MAC address and the packet header at this layer includes both a source and destination MAC address so as to properly traverse the layer. Layer 3 of the ISO is the network layer and includes the Internet (or Internetwork) Protocol ("IP"), which permits routing of packets from one network to another. In this layer 3, "Differentiated Services" ("DiffServ") are expected to be widely deployed. In particular, "Assured Services" of the DiffServ architecture facilitate a priority-based drop precedence in the event of congestion. Packets of a session/flow are colored, in descending order of importance or drop precedence, as green, yellow, and red, depending on the rate and thereby leading to a highly scalable congestion management in ISO layer 3. As a consequence, the present inventors have observed that Ethernet, being the ISO layer 2 transportation technology, would be highly improved as supporting such differentiation that is not only scalable but is also consistent with the Assured Forwarding model of the DiffServ.

In view of the above, there arises a need to address the drawbacks of the prior art as well as the considerations of other layer technologies, as is accomplished by the preferred embodiments described below.

BRIEF SUMMARY OF THE INVENTION

In the preferred embodiment, there is a network system. The system comprises a first network node, and the node comprises an input for receiving packets. During operation, the first network node operates as a downstream node when receiving packets at the input from an upstream node. The node also comprises a buffer, coupled to the input and for storing received packets, and circuitry for detecting when a number of packets stored in the buffer exceeds a buffer storage threshold. The node also comprises circuitry, responsive to a detection by the circuitry for detecting that the number of packets stored in the buffer exceeds the buffer storage threshold, for issuing a message to the upstream node. The message selectively commands the upstream node to reduce a rate of transmission of packets from the upstream node to the downstream node to a non-zero rate.

Other aspects are also described and claimed.

DETAILED DESCRIPTION OF THE INVENTION

Figure 1:
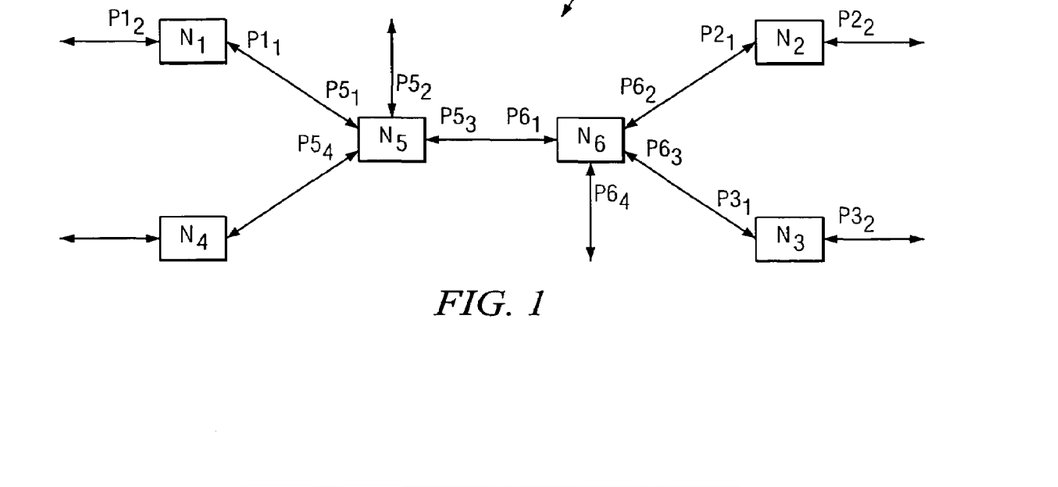
FIG. 1 illustrates a block diagram of a network system 10 into which the preferred embodiments may be implemented.

FIG. 1 illustrates a block diagram of a system 10 into which the preferred embodiments may be implemented.

System 10 generally represents an Ethernet network that includes a number of switch nodes. By way of example, system 10 includes six such nodes $N_1$ through $N_6$. These nodes include various aspects as known in the art, such as operating to switch packets from a source node toward a destination node. As also known in the art, system 10 is typically coupled with nodes beyond those shown in system 10, such as may be implemented in the global Internet or at remotely located networks. Thus, those other nodes may communicate packets with and through system 10. One skilled in the art should appreciate that the number of nodes shown in FIG. 1 is solely by way of example and to simplify the illustration and example, where in reality system 10 may include any number of such nodes.

Each node in FIG. 1 is shown to have a number of ports, and for sake of convention each such port is labeled with the letter "P" and is followed by a number corresponding to the same node. For example, node $N_1$ has a port $P1_1$ and a port $P1_2$; thus, each such port may be represented as $P1_x$, where the subscript "x" for each such node is added to distinguish multiple ports at the same node. For example, node $N_1$ has the two ports just mentioned, while node $N_5$ by way of example has four ports, $P5_1$, $P5_2$, $P5_3$, and $P5_4$. During operation of each node, each of its ports may serve as either an input or an output, based on the packet traffic direction then occurring with respect to that node. Further, the physical connection between a port of one node and the port of an immediately-adjacent node is referred to as a link. Given the links and the preceding conventions, then the connectivity in FIG. 1 is as shown in the following Table 1:

TABLE 1

| Node | connected to | by port |
|---|---|---|
| $N_1$ | $N_5$ | $P1_1$ |
| $N_2$ | $N_6$ | $P2_1$ |
| $N_3$ | $N_6$ | $P3_1$ |
| $N_4$ | $N_5$ | $P4_1$ |
| $N_5$ | $N_1$ | $P5_1$ |
| $N_5$ | $N_4$ | $P5_4$ |
| $N_5$ | $N_6$ | $P5_3$ |
| $N_6$ | $N_5$ | $P6_1$ |
| $N_6$ | $N_2$ | $P6_2$ |
| $N_6$ | $N_3$ | $P6_3$ |

Lastly, various other ports are shown with extending links generally to illustrate that additional connectivity may be made with respect to system 10.

During operation of system 10, certain attributes are comparable in a general sense to the prior art and are now explored by way of background and also to further demonstrate conventions to be used when later detailing various distinctions of the preferred embodiments. In general, each node $N_x$ in FIG. 1 may switch traffic to an adjacent node to which it is directly connected. To achieve this operation, each node $N_x$ includes one or more buffers, and those buffers are managed for purposes of congestion detection in a manner that considers the input port of the given node and an output port of another node that is providing packet traffic. For example, consider the case of the link between nodes $N_1$ and $N_5$, and consider an instance where node $N_5$ is receiving packets at its port $P5_1$ from node $N_1$ via its port $P1_1$; in this case, therefore, port $P5_1$ may be considered an input port and port $P1_1$ may be considered an output port. Also, by way of convention in this case, node $N_5$ is said to be the downstream node and node $N_1$ the upstream node, where this is defined by the direction of the packet passing "downstream" from node $N_1$ to node $N_5$. Continuing with nodes $N_1$ and $N_5$, node $N_5$ includes a buffer that stores and identifies packets received at its port $P5_1$ from port $P1_1$ of node $N_1$. Note that this may be a separate buffer space or space shared with other packets, but in either case a manner exists for identifying those packets that have in common a same input port of the downstream node and output port of the upstream node. Further, in both the prior art and the preferred embodiments, when such a buffer reaches a critical threshold, that event is deemed to indicate a congestion state of the buffer. In response, the downstream node, $N_5$, sends a pause message to the upstream node, $N_1$. In the prior art under IEEE 802.3x, this pause message causes the upstream node, $N_1$, to cease transmitting any additional packet(s) via its port $P1_1$ to port $P5_1$ of the downstream node $N_5$, for a duration of time specified in the pause message. In the preferred embodiments and in one instance as detailed later, a same result is reached. However, in other instances in the preferred embodiments, quite different results are achieved by providing additional manners of congestion detection and optionally also considering packet drop precedence in establishing the manner of packet transmission restraint imposed on the upstream node. These additional aspects will be appreciated by one skilled in the art given the remaining discussion in this document.

Figure 2:
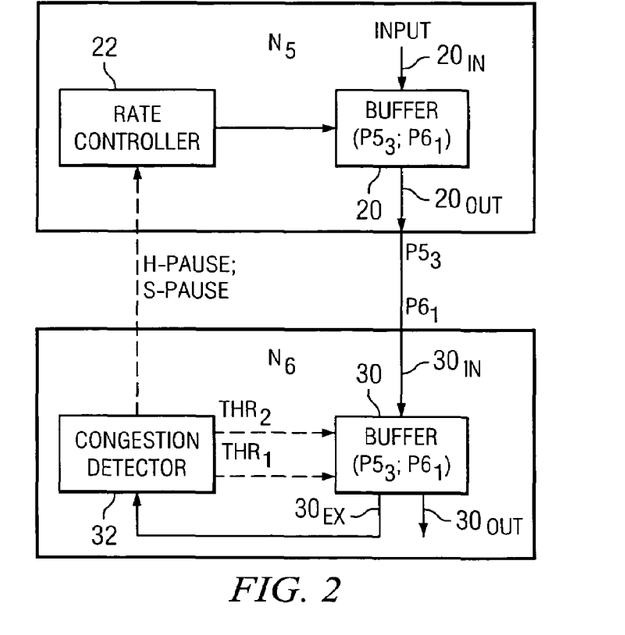
FIG. 2 illustrates a block diagram of various aspects of the preferred embodiment as included in two different nodes, one functioning in an upstream capacity and the other functioning in a downstream capacity.

FIG. 2 illustrates a block diagram of various aspects of the preferred embodiment as included in each switch node $N_x$ in system 10, but for sake of illustration these aspects are illustrated for the example of node $N_5$ as an upstream node and node $N_6$ as a downstream node. Note, therefore, that node $N_5$ includes comparable structure to operate as a downstream node relative to node $N_6$ as an upstream node, but such comparable structure is not shown so as to simplify the illustration and remaining discussion. In addition, one skilled in the art should understand that each node $N_1$ includes various other circuitry not illustrated but as will be understood to be included so as to support the functionality known in the art to be provided by such a node. In order to simplify the illustration, therefore, FIG. 2 instead illustrates only those aspects that are particularly directed to the preferred embodiments. Further, these aspects are generally described in terms of functionality, where one skilled in the art may readily ascertain various hardware and/or software to implement such functionality.

Turning to the specifics illustrated in FIG. 2 and with respect to upstream node $N_5$, it includes a buffer 20, which may be implemented as any data storage device sufficient to store a number of network packets. Buffer 20 has an input $20_{IN}$ for receiving packets from any port of node $N_5$, and in the illustrated example each of those packets is buffered in a first-in first-out manner to be output along output $20_{OUT}$ to port $P5_3$, from where they pass to port $P6_1$ of downstream node $N_6$. Note that buffer 20 logically may be a portion of a buffer that stores packets related to other ports, where in such a case those packets in such a buffer and to be output along output $20_{OUT}$ to port $P5_3$ and to port $P6_1$ of node $N_6$ are readily distinguishable from any other packet(s) in such a buffer. However, for sake of this document and unless stated otherwise, it is assumed each time that buffer 20 is discussed, then the reference is to just those packets to be transmitted from port $P5_3$ of node $N_5$ to port $P6_1$ of node $N_6$. Node $N_5$ also includes a rate controller 22, which may be implemented using software, hardware, or a combination thereof, as ascertainable by one skilled in the art, so as to provide the functionality described in this document. By way of introduction to such functionality, rate controller 22 is operable to receive from another node a pause message, of varying types, and to respond by controlling the rate at which the packets in buffer 20, or a portion of those packets, are transmitted downstream to node $N_6$.

Looking now to downstream node $N_6$, it includes a buffer 30, which also may be implemented as any data storage device sufficient to store a number of network packets. Buffer 30 has an input $30_{IN}$ for receiving packets from port $P6_1$ of node $N_6$, and in the illustrated example each of those packets is buffered in a first-in first-out manner to be output along an output $30_{OUT}$. Output $30_{OUT}$ may provide the packets to any one of the ports of node $N_6$, which recall from FIG. 1 include nodes $P6_1$, $P6_2$, $P6_3$, and $P6_4$, although in the illustrated example port $P6_1$ is the input port to buffer 30 so it generally will not also operate as the output port for packets it receives an as input port. Also, note that buffer 30 may be logically a portion of a buffer that stores packets related to other ports, where in such a case the packets that are received at port $P6_1$ of node $N_6$, from port $P5_3$ of node $N_5$, are readily distinguishable from any other packet(s) in such a buffer. However, for sake of this document and unless stated otherwise, it is assumed each time that buffer 30 is discussed, then the reference is to just those packets received at port $P6_1$ of node $N_6$ from port $P5_3$ of node Ns. Buffer 30 also is coupled to a congestion detector 32, where the coupling is shown as an examination line $30_{EX}$, intending to depict that congestion detector 32 is operable to examine the packets in buffer 30. By way of introduction to this examination and as detailed later, in a preferred embodiment, congestion detector 32 determines if the number of packets in buffer 30 reaches one of two different thresholds $THR_1$ and $THR_2$, where in response to either such threshold being met, congestion detector 32 transmits a pause message back to the upstream node that transmitted the packet to the input port of the downstream node; thus, in the present example where the packets at issue in buffer 30 are associated with an input port $P6_1$ of node $N_6$ and an output port $P5_3$ of node $N_5$, then the pause message is transmitted to node $N_5$, as shown generally by a dashed line from congestion detector 32 to rate controller 22 of node $N_5$. Moreover, as also detailed below, in the preferred embodiment the pause message may take one of two forms, one denoted a hard pause ("H-PAUSE") and the other denoted a soft pause ("S-PAUSE"). The PAUSE message, based on its type, causes a response in the rate of transmission of node $N_5$ from port $P5_2$ to port $P6_1$ of node $N_6$. More specifically and as suggested by these respective names, an H-PAUSE may cause, for a period of time, an absolute pause, or cessation, in the transmission of node $N_5$ from its port $P5_3$ to port $P6_1$ of node $N_6$, while an S-PAUSE may cause, for a period of time, a reduced rate in the transmission of node $N_5$ from its port $P5_3$ to port $P6_1$ of node $N_6$. Additional conditions, preferably relating in part to the drop precedence of the downstream and upstream buffered packets, may alter the effect of the PAUSE messages, as further detailed below. Lastly, and for reasons more clear below, congestion detector 32 also includes sufficient functionality to ascertain both the input rate $R_{IN}$ and output rate $R_{OUT}$ of packets with respect to each port in node $N_6$, as well as the drop precedence of the packets in buffer 30.

Figures 3, 4:
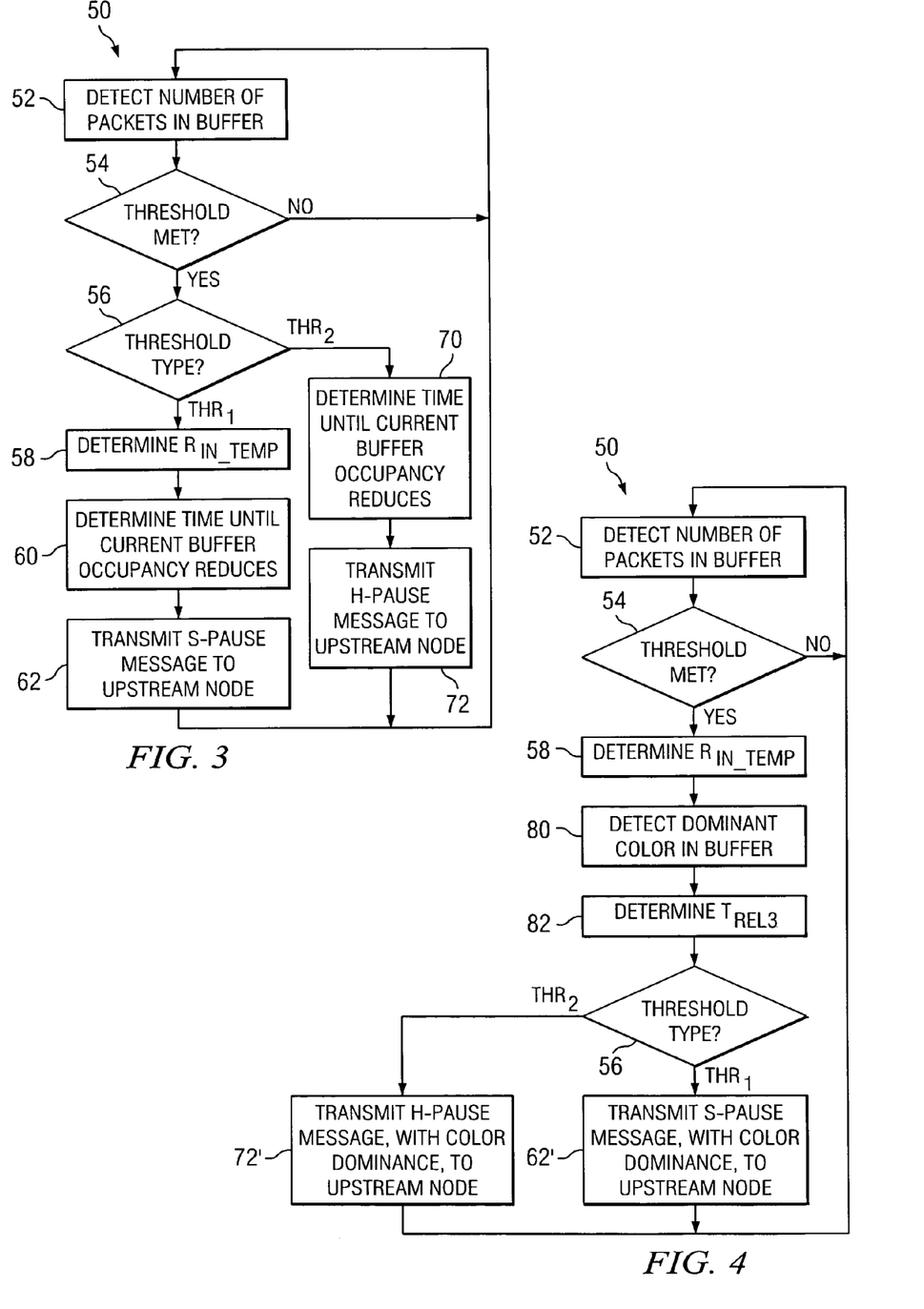
FIG. 3 illustrates a flow chart of a method describing a first preferred embodiment of operation of a node operating as a downstream node.
FIG. 4 illustrates a flow chart of a method describing a second preferred embodiment of operation of a node operating as a downstream node.

FIG. 3 illustrates a flow chart of a method designated generally at 50 and that depicts a first preferred embodiment of operation of a switch node $N_x$ operating as a downstream node. By way of context, therefore, method 50 is described in connection with node $N_6$ of FIG. 2. The method 50 operations may be achieved through sufficient configuration and programming of congestion detector 32 relative to its corresponding buffer 30. Further, note that various steps of method 50, as well as an alternative method detailed later, may be altered or re-ordered in time without departing from the overall inventive scope. Also by way of introduction, note that method 50 is a less complex alternative to the more involved method described later, where in the latter case packet drop precedence is further contemplated as a factor in the operation of the downstream node. Looking then to method 50, it begins with a step 52. In step 52, congestion detector 32 detects the number of packets in buffer 30, as may be achieved via examination line $30_{EX}$. Once the number of packets is determined, method 50 continues from step 52 to step 54.

Step 54 controls flow of method 50 based on whether a threshold is met by the number of packets detected in step 52. Recall that the preferred embodiment contemplates two thresholds, $THR_1$ and $THR_2$ both indicating respective levels of packet fullness in buffer 30 of the downstream node. For reasons detailed below, note that threshold $THR_2$ is larger than threshold $THR_1$, and by way of further introduction note that a finding that the lower threshold $THR_1$ is met provides in effect an early warning that congestion in buffer 30 may be imminent, whereas a finding that the larger threshold $THR_2$ is met provides in effect an indication that intolerable buffer congestion is occurring. The remaining discussion of method 50 discusses the responses to these indications. In any event, if neither threshold is met, then step 54 returns the flow to step 52. However, if either threshold is met, then step 54 continues the flow to step 56.

Step 56, having been reached because a threshold was met, directs the remaining flow based on the type of threshold. If the lower threshold, $THR_1$, is met, then step 56 continues the flow to step 58. If the larger threshold, $THR_2$, is met, then step 56 continues the flow to step 70. Each of these alternative paths is described below.

Step 58, having been reached because the lower threshold, $THR_1$, was met, determines a desirable packet input rate, $R_{IN\_TEMP}$, for a period of future packets into buffer 30, given that buffer 30 has reached a level of fullness equal to threshold $THR_1$. Thus, in the example of FIG. 2, $R_{IN\_TEMP}$ is determined with respect to packets that will be received at port $P6_1$ from port $P5_3$. Recalling that the lower threshold $THR_1$ provides an early warning of potential congestion in buffer 30, then this desired rate is therefore determined in an effort to allow the output rate, $R_{OUT\_30}$, from output $30_{OUT}$ to temporarily exceed the input rate at input $30_{IN}$, so as to alleviate the packet fullness that gave rise to the early warning of congestion in buffer 30. Thus, the desire is to temporarily reduce $R_{IN\_TEMP}$ to a level lower than the input rate that exists at the time the threshold is detected, with the reduction still allowing transmission to buffer 30 at a rate greater than zero but also reduced so as to alleviate congestion. One manner of determining $R_{IN\_TEMP}$ in one preferred embodiment is to multiply the then-current output rate $R_{OUT\_30}$ at output $30_{OUT}$ of the node times some constant less than 1.0. For example, setting the constant equal to 0.8, then step 58 determines $R_{IN\_TEMP}$ according to the following Equation 1:

$$R_{IN\_TEMP} = R_{OUT\_30} * 0.8 \quad \text{Equation 1}$$

Next, method 50 continues from step 58 to step 60.

Step 60 determines an estimated amount of time, $T_{REL1}$, that is likely to be required before the present fullness of buffer 30 is relieved to some desired extent, that is, so as to avoid the buffer fullness from being near the current lower threshold $THR_1$. In the preferred embodiment, this determination takes into account that the above-described desired new input rate, $R_{IN\_TEMP}$, has been evaluated and, as shown below, preferably will be adhered to by the upstream node causing the congestion. Accordingly, in order to alleviate a number of packets P in buffer 30, then $T_{REL1}$ is determined according to the following Equation 2:

$$T_{REL1} = \frac{P}{R_{OUT\_30} - R_{IN\_TEMP}} \quad \text{Equation 2}$$

Next, method 50 continues from step 60 to step 62.

In step 62, the downstream node issues a soft pause message S-PAUSE to the adjacent upstream node, where the S-PAUSE message includes some indication that it is such a message and also includes the step 58 value of $R_{IN\_TEMP}$ and the step 60 value of $T_{REL1}$. Thus, in the present example, the S-PAUSE message is issued from node $N_6$ to node $N_5$, as relating to the packets received by node $N_6$ at its port $P6_1$ connected to the adjacent port $P5_3$ of node $N_5$. In response to receiving the S-PAUSE message, the upstream node $N_5$ is thereby commanded in one preferred embodiment to temporarily reduce the rate of its transmission to the downstream node that transmitted the S-PAUSE, where the reduced transmission rate is equal to $R_{IN\_TEMP}$, that is, the desired input rate of the adjacent downstream node, where recall that rate is included in the S-PAUSE message sent by that downstream node to the upstream node. Thus, returning briefly to FIG. 2, in response to the S-PAUSE message, rate controller 22 of the upstream node $N_5$ reduces its packet transmit speed in response to $R_{IN\_TEMP}$. Also in a preferred embodiment, the duration of the temporary transmission rate by the upstream node is the value of $T_{REL1}$ as also received by the upstream node in the S-PAUSE message. Accordingly, provided the upstream node adheres to these requirements, then one skilled in the art will appreciate that there is an increased likelihood that the amount of packets in the downstream buffer 30 will be reduced below threshold $THR_1$ because it is likely that during the period of $T_{REL1}$ the rate $R_{OUT\_30}$ at output $30_{OUT}$ will exceed the rate at input $30_{IN}$, thereby alleviating any potential congestion. Further, once the duration of $T_{REL1}$ has expired, then the upstream node is permitted or expected to transmit according to its ordinary rate, as ascertainable in the art. Lastly, once step 62 is complete, method 50 returns from step 62 to step 52.

By way of summarizing the preceding discussion relative to the S-PAUSE message, one skilled in the art should appreciate that such a message is generated in a downstream node that detects an early warning of potential congestion, as indicated by its buffer reaching a level of fullness, $THR_1$, that is short of a larger level, $THR_2$, that represents a more urgent congestion event. When the early warning detection occurs, the downstream node issues the S-PAUSE message to the upstream node that is providing the congesting packets, thereby requesting the upstream node to reduce its transmission rate to the downstream node for a certain period of time. Note, therefore, that the S-PAUSE message differs from the present state of the art IEEE 802.3x pause message, as that latter message commands the upstream node(s) to completely cease communicating all packets downstream for a period of time. Thus, the preferred embodiment instead permits a temporary reduction in transmission rate, rather than an absolute cessation, in an effort to avoid the possibility of greater congestion.

Returning to FIG. 3, attention is now directed to step 70 and the sequence thereafter, which recall is reached when packet occupancy in buffer 30 reaches a larger threshold $THR_2$. By way of introduction, in this case the detected threshold signifies a larger amount of packets in buffer 30 as compared to that discussed above with respect to threshold $THR_1$ and, hence, a more demanding restriction in transmission from the upstream node is preferred. Indeed, in one embodiment, step 70 and the subsequent step 72 may simply follow the same approach as that of the prior art. In such a case, step 70 determines an estimated amount of time, $T_{REL2}$, that is likely to be required before the present fullness of buffer 30 is relieved to some desired extent, that is, so as to avoid being near the current upper threshold $THR_2$ and possibly also to be below the lower threshold $THR_1$. In contrast to $T_{REL1}$ which contemplates a reduced transmission rate, however, in one preferred embodiment, the step 70 determination assumes that the upstream node will be completely prohibited from transmitting to the downstream node for a period of time. Thus, during this period of time, and again in order to alleviate a number of packets P in buffer 30, then $T_{REL2}$ is determined according to the following Equation 3:

$$T_{REL2} = \frac{P}{R_{OUT\_30}} \quad \text{Equation 2}$$

Next, method 50 continues from step 70 to step 72.

Step 72 operates in a manner comparable to the prior art IEEE 802.3x, as an H-PAUSE message is sent by the downstream node to the upstream node similar to the single pause message that exists under 802.3x. Also, in one preferred embodiment, in response to receiving the H-PAUSE message, the upstream node is thereby commanded to temporarily cease any transmission to the downstream node that transmitted the H-PAUSE message, where the duration of that cessation is $T_{REL2}$, as also included in the H-PAUSE message. However, in an alternative preferred embodiment, even in connection with receiving an H-PAUSE message, an upstream node may in some circumstances communicate to the downstream node, based on an additional evaluation with respect to packet drop precedence as further detailed below.

FIG. 4 illustrates a flow chart of a method designated generally at 50' as an alternative to method 50 of FIG. 3, thereby providing an alternative preferred embodiment. Various steps in FIG. 4 are the same as those in FIG. 3 and for such steps the same reference numbers used in FIG. 3 are carried forward into FIG. 4. However, in certain instances, the ordering of these steps differs as between FIGS. 3 and 4, and two additional new steps are introduced in FIG. 4. These various differences as well as the results from them are further appreciated below.

Method 50' commences with step 52 where the number of packets in buffer 30 is determined, followed by step 54 which determines if the step 52 packet number exceeds a threshold. If the threshold is exceeded, then method 50' proceeds to step 58 rather than to step 56 as was the case with method 50 of FIG. 3; in both embodiments, step 58 performs in the same general sense in that it determines the desired packet input rate, $R_{IN\_TEMP}$, for packets into buffer 30, where again such a determination may be made, by way of example, according to Equation 1. Next, method 50' continues from step 58 to a step 80.

In step 80, the downstream node (e.g., $N_6$) determines the number of packets in each drop precedence category of buffer 30. More particularly, in the preferred embodiment, drop precedence is evaluated by looking to the Assured Services of the DiffServ architecture, as introduced earlier in the Background Of The Invention section of this document. Thus, as known in the art, according to Assured Services, packets are assigned a drop precedence color, from most to least important (i.e., most protected to least protected for being dropped), as green, yellow, or red, in ISO layer 3. According to the preferred embodiment, however, this same scheme is brought to the ISO layer 2, such as by having the indication included within the Ethernet (i.e., layer 2) portion of the packet by an ingress node in the network that receives and transmits the packet, and the color designation may be removed from the layer 2 portion of the packet as the packet is communicated by an egress node in the network. Note that the ingress and egress nodes are nodes known in the art, with the former being an entry node for a packet entering in a Metro Ethernet domain and the latter being the exit node for a packet leaving a Metro Ethernet domain. In any event, with this information at ISO layer 2, then congestion detector 32 further includes the functionality of being able to ascertain the number of packets in each drop precedence category, that is, of each different color. Such functionality may be achieved by including separate counters that increment with receipt of each colored-packet into buffer 30 and decrement as each such packet leaves buffer 30. Next, method 50' continues from step 80 to step 82.

Step 82 operates in a comparable manner to steps 60 and 70 described above, that is, to determine an estimated amount of time that is likely to be required before the present packet occupancy of buffer 30 is relieved to some desired extent, and given whether the present threshold that is met is threshold $THR_1$ or $THR_2$. Also, for the sake of distinction from the earlier discussion, the step 82 determined time is designated as $T_{REL3}$. Note also that $T_{REL3}$ may be determined based on the number of packets P in buffer 30 as well as the color distribution of those packets. Moreover, if the congestion in buffer 30 is not alleviated as a result of a determined value of $T_{REL3}$, then step 82 will be reached once again at which point a new value of $T_{REL3}$ will be determined based on the new and corresponding number of packets P in buffer 30 as well the color distribution of those packets. Next, method 50' continues from step 56.

Step 56 of method 50' again directs the remaining flow based on the type of threshold that was detected in the preceding step 54. However, the resulting steps following step 56 in method 50' differ from that of method 50 in certain manners. If the lower threshold, $THR_1$, is met, then step 56 continues the flow to step 62'. If the larger threshold, $THR_2$, is met, then step 56 continues the flow to step 72'.

In step 62', the downstream node issues an S-PAUSE message, which includes the step 80 requested pause time, $T_{REL3}$, and the step 58 desired input rate, $R_{IN\_TEMP}$. In addition, however, in connection with this alternative embodiment of method 50', the S-PAUSE message further includes the color that dominates the number of packets in buffer 30. More particularly, recall that step 80 previously determined the number of packets for each of the three drop precedence colors in buffer 30. From these numbers, the dominant color is the one having the largest number of packets in buffer 30 with that color, and the S-PAUSE message includes that information when it is transmitted to the downstream node. After step 62', method 50' returns to step 52.

In step 72', the downstream node issues an H-PAUSE message; however, as shown below, in certain instances the upstream node that receives this message does not cease transmitting to the downstream node, but instead it transmits at a reduced rate for a period of time. Toward this end, in the alternative embodiment provided by method 50', then the H-PAUSE message also includes the step 80 requested pause time, $T_{REL3}$, and the step 58 desired input rate, $R_{IN\_TEMP}$. In addition, like the S-PAUSE message of step 62', the step 72' H-PAUSE message further includes the color that dominates the number of packets in buffer 30. After step 72', method 50' returns to step 52.

After the alternative preferred embodiment of method 50' has issued either an S-PAUSE or an H-PAUSE message, then the response to those messages is preferably also an alternative embodiment to the responses described above relative to method 50. More specifically, in connection with method 50', the upstream node's response depends not only on the timing information in those messages, but also considers the color dominance indication that is also provided in the message. This additional consideration permits a favorable response by the upstream node while further taking into account drop precedence in connection with the ISO layer 2 congestion control. Such factors are appreciated from the following discussion, where the response to the method 50' S-PAUSE or H-PAUSE messages are both described.

Before detailing the differences in the method 50' response of an upstream node to receiving either an S-PAUSE message or an H-PAUSE message, note that such responses both have in common a manner in which that upstream node's output buffer 20 is evaluated in response to such a message. Specifically, the upstream node determines its response to the message based on the color dominance of its own buffer 20, which recall stores packets to be output along output 20$_{OUT}$ to the downstream node. In this regard, in the preferred embodiment the upstream node also includes the functionality of determining the number of packets stored in buffer 20 of each packet drop precedence type (e.g., color); in some respects, this may be achieved in a comparable manner to that described above relative to the same determination by the downstream node. However, when the upstream node evaluates the color dominance in its buffer 20, then preferably it does not consider the color dominance of the packets occupying the entire buffer 20. Instead, the upstream node preferably examines packet occupancy in only a portion of its buffer 20, where that portion corresponds to the number of packets in buffer 20 that would be expected to be transmitted during the duration of $T_{REL3}$, where recall that $T_{REL3}$ is specified in either the S-PAUSE or H-PAUSE message, and it indicates an estimated amount of time that is likely to be required to relieve the present fullness of the buffer 30 in the downstream node. More specifically, rate controller 22 of the upstream node by definition will be informed of the output transmission rate, $R_{OUT\_20}$, for the upstream node; thus, without a change in that rate, then a certain number of packets, $N_T$, will be transmitted from buffer 20 during the period of $T_{REL3}$, where that number is as shown in the following Equation 3:

$$N_T = T_{REL3}/R_{OUT\_20} \qquad \text{Equation 3}$$

Given the number, $N_T$, of packets oriented as the next $N_T$ packets to be output from buffer 20, then the upstream node determines the color (or other drop precedence) dominance of only those $N_T$ packets, as opposed to all of the packets in its buffer 20. Note then that the $N_T$ packets define only a portion of the upstream node's buffer 20 and that number relates to the relief time, $T_{REL3}$, of the downstream buffer; thus, the number $N_T$ of packets is also referred to hereafter as a "relief time buffer space," thereby indicating the portion of packets in buffer 20 corresponding to those that would be transmitted during the relief time, $T_{REL3}$, without any additional change in transmission rate from the upstream buffer. With this information, the response to either the S-PAUSE or H-PAUSE message is as described below.

In the preferred embodiment for an upstream node responding to an S-PAUSE message generated by method 50' from a downstream node, the upstream node does not always reduce its transmission rate to the downstream node, but instead in some instances it determines whether a transmission rate reduction is desirable based on the color dominance indicated in the pause message as well as the color dominance in its own relief time buffer space (i.e., relative to the $N_T$ packets in its buffer 20). Particularly, the upstream node responds as shown in the following Table 2:

TABLE 2

| downstream node buffer 30 color dominance | upstream node response based on relief time buffer space |
| --- | --- |
| red | reduce $R_{OUT\_20}$ if dominant red; else, continue transmission at regular $R_{OUT\_20}$ |
| yellow | reduce $R_{OUT\_20}$ if dominant red or yellow; else, continue transmission at regular $R_{OUT\_20}$ |
| green | reduce $R_{OUT\_20}$ |

The information of Table 2 may be further appreciated by discussing the three possible occurrences, as is done below.

According to the first row of Table 2 (i.e., below the Table headings), if an S-PAUSE message is transmitted by a downstream node with a red packet dominated buffer 30, then the upstream node reduces its $R_{OUT\_20}$ if its own relief time buffer space of its buffer 20 is also red dominant. As a result, for a period preferably equal to $T_{REL3}$, the packets in the relief time buffer space of buffer 20 in the upstream node are transmitted at a slower rate to the downstream node. Thus, during $T_{REL3}$, the downstream buffer 30 has an opportunity to transmit packets at a greater rate than it is receiving them from the upstream node. Thus, congestion from an early warning at threshold $THR_2$ which gave rise to the S-PAUSE message, likely will be alleviated. Note, however, that in response to the same S-PAUSE message, if the upstream node has in its relief time buffer space a dominance of either green or yellow packets, or a dominance of combined green and yellow packets, then the upstream node preferably continues to transmit at its normal operating $R_{OUT\_20}$. Thus, in this case, the preferred embodiment recognizes that a green and/or yellow dominance of the upstream node favors allowing it to continue to transmit at its ordinary $R_{OUT\_20}$ to the congested downstream node because the dominant color of the upstream packets carries a higher priority (i.e., a higher drop precedence) over the red dominance in the downstream node buffer.

According to the second row of Table 2, if an S-PAUSE message is transmitted by a downstream node with a yellow packet dominated buffer 30, then the upstream node reduces its $R_{OUT\_20}$ if its own relief time buffer space of its buffer 20 is red or yellow dominant, or if it is dominated by the combination of yellow and red packets. As with the preceding case, therefore, for a period preferably equal to $T_{REL3}$, the packets in the relief time buffer space of buffer 20 in the upstream node are transmitted at a slower rate to the downstream node, with a goal to reduce congestion at the downstream node. Note, however, that in response to the same S-PAUSE message, if the upstream node has in its relief time buffer space a dominance of green packets, then the upstream node preferably continues to transmit at its normal operating $R_{OUT\_20}$. Again, therefore, the preferred embodiment recognizes in this instance that the green dominance of the upstream node favors allowing it to continue to transmit at its ordinary $R_{OUT\_20}$ to the congested downstream node because the dominant green color of the upstream packets carries a higher priority than the yellow dominance of the packets in the downstream node buffer.

According to the third row of Table 2, if an S-PAUSE message is transmitted by a downstream node with a green packet dominated buffer 30, then the upstream node always reduces its $R_{OUT\_20}$, regardless of the packet dominance in its own relief time buffer space of its buffer 20. This approach is again consistent with prioritizing the response based on the relative color dominance. In this case, since the downstream node is congested with primarily the highest priority packets (i.e., green drop precedence), then the preferred embodiment favors allowing that congestion to be relieved because by definition there cannot be a higher priority dominance in the upstream node relief time buffer space. Thus, for a period preferably equal to $T_{REL3}$, the packets in the relief time buffer space of buffer 20 in the upstream node are transmitted at a slower rate to the downstream node, again with a goal to reduce congestion at the downstream node.

In the preferred embodiment for an upstream node responding to an H-PAUSE message generated by method 50' from an adjacent downstream node, the upstream node does not always cease its transmission to the downstream node, but instead in some instances it determines whether continued transmission, at a reduced rate, is desirable based on the color dominance indicated in the pause message as well as the color dominance in its own relief time buffer space (i.e., relative to the $N_T$ packets in its buffer 20). Particularly, the upstream node responds as shown in the following Table 3:

TABLE 3

| downstream node buffer 30 color dominance | upstream node response based on relief time buffer space |
|---|---|
| red | cease transmitting if dominant red; else, continue transmission at reduced $R_{OUT\_20}$ |
| yellow | cease transmitting if dominant red and/or yellow; else, continue transmission at reduced $R_{OUT\_20}$ |
| green | cease transmitting |

The information of Table 3 may be further appreciated by discussing the three possible occurrences, as is done below.

According to the first row of Table 3 (i.e., below the Table headings), if an H-PAUSE message is transmitted by a downstream node with a red packet dominated buffer 30, then the upstream node ceases transmitting to the downstream node, preferably for $T_{REL3}$, if its own relief time buffer space of its buffer 20 is also red dominant. As a result, for a period preferably equal to $T_{REL3}$, the packets in the relief time buffer space of buffer 20 are not transmitted, while at the same time the downstream buffer 30 has an opportunity to transmit packets. Thus, congestion from the more severe nature of the threshold $THR_2$, which gave rise to the H-PAUSE message, likely will be alleviated. Note, however, that in response to the same H-PAUSE message, if the upstream node has in its relief time buffer space a dominance of either green or yellow packets, or a dominance of combined green and yellow packets, then the upstream node continues to transmit, but at a reduced rate of $R_{OUT\_20}$. Thus, in this case, the preferred embodiment recognizes that the green and/or yellow dominance of the upstream node favors allowing it to continue to transmit, although at a reduced $R_{OUT\_20}$ rate, to the congested downstream node because the dominant color of the upstream packets carries a higher priority (i.e., a higher drop precedence) over the red dominance in the downstream node buffer. In other words, here the reduced downstream rate will allow the red dominance in the downstream node buffer to be alleviated, while still allowing the dominant color of the upstream packets some ability to continue transmitting, albeit at a reduced rate, to the severely congested downstream node.

According to the second row of Table 3, if an H-PAUSE message is transmitted by a downstream node with a yellow packet dominated buffer 30, then the upstream node ceases transmitting to the downstream node, preferably for $T_{REL3}$, if its own relief time buffer space of its buffer 20 is either red or yellow dominant, or if the combination of its red and yellow packets are dominant. In these instances, therefore, for a period preferably equal to $T_{REL3}$, the packets in the relief time buffer space of buffer 20 in the upstream node are not transmitted, with a goal to reduce congestion at the downstream node by allowing it to transmit while not receiving packets from the upstream node. Note, however, that in response to the same H-PAUSE message, if the upstream node has in its relief time buffer space a dominance of green packets, then the upstream node preferably continues to transmit at a reduced level of its $R_{OUT\_20}$. Thus, the preferred embodiment recognizes in this instance that the dominance of the upstream node favors allowing it to continue to transmit, albeit it at a reduced rate of $R_{OUT\_20}$, even though the downstream node is severely congested, because the dominant green color of the upstream packets carries a higher priority than the yellow dominance of the packets in the downstream node buffer.

According to the third row of Table 3, if an H-PAUSE message is transmitted by a downstream node with a green packet dominated buffer 30, then the upstream node always stops its transmissions for a period of time, preferably equal to T regardless of the packet dominance in its own relief time buffer space of its buffer 20. Thus, in this sense, the response as the same is the response to a pause message under IEEE 802.3x. Here, however, this approach is taken with recognition of the relative color dominance of the buffer status in the upstream node. Specifically, since the downstream node is congested with primarily the highest priority packets (i.e., green drop precedence), then the preferred embodiment favors allowing that congestion to be relieved because there by definition cannot be a higher priority dominance in the upstream node relief time buffer space. Thus, for a period preferably equal to $T_{REL3}$, the packets in the relief time buffer space of buffer 20 are not transmitted to the downstream node, again with a goal to reduce congestion at the downstream node.

From the above illustrations and description, one skilled in the art should appreciate that the preferred embodiments provide a network system in which the upstream switch transmission rate is controlled in response to traffic buffering in the adjacent downstream switch. The preferred embodiments provide various alternatives, including the functionality of reducing the transmission rate at an upstream node in response to an adjacent downstream node. In one embodiment, the upstream node is requested to reduce its transmission rate in response to a first level of downstream node congestion and to stop its transmission in response to a second level of downstream node congestion. In another embodiment, the upstream node is made aware of the downstream congestion, but the response may be to continue transmitting, to reduce the transmitting rate, or to cease transmitting, based on the level of congestion at the downstream node as well as the packet drop precedence dominance in the downstream node's buffer as well as the packet drop precedence dominance in at least a portion of the upstream node's buffer. With these various embodiments, they provide various benefits over the prior art. For example, unlike the current standard IEEE 802.3x, the preferred embodiment permits reduced transmission rates rather than absolute cessation in certain instances of downstream congestion, thereby maintaining some level of traffic flow despite the congestion and also giving consideration to packet importance, as reflected by way of example in packet color. As another benefit, the S-PAUSE and H-PAUSE messages of the preferred embodiments may be readily implemented into the 802.3x standard by extending the present 802.3x format pause message. Specifically, that format includes sufficient unused reserved bytes, some of which may be used to encode the various information discussed above to identify the type of PAUSE message as well as to include certain additional information in the message (e.g., downstream buffer relief time, desired downstream input rate, downstream buffer color dominance). As another benefit, the lower threshold $THR_1$ facilitates early congestion notification and the ability to throttle aggressive sources before transmission of packets is completely stopped by an IEEE 802.3x pause message. As another benefit, the preferred embodiments are fully compatible with the DiffServ model, and moreover, higher precedence packets (i.e., green and yellow) incur lower delays and are relatively less impacted if the congestion is due to lower precedence (i.e., red) packets. As still another benefit, the preferred embodiments exploit the point-to-point feedback (pause) propagation for congestion control such that long-term fairness can also be improved/achieved. As another benefit, the preferred embodiments are independent of the number of individual flows, and monitor traffic rates only on an a downstream incoming link, upstream outgoing link pair basis, at any given node; thus the preferred embodiments are highly scalable. Also, the preferred embodiments may be applied even to multiple traffic classes. As a final benefit, while the present embodiments have been described in detail, various substitutions, modifications or alterations could be made to the descriptions set forth above without departing from the inventive scope. For example, while the illustrated embodiment depicts an Ethernet network, the scope may apply to other networks. As another example in an another embodiment, while preferably the PAUSE message is communicated back to, and controls, an adjacent upstream message, that control may be extended to other more distant nodes. As still another example, while color dominance is used above as a consideration, the total number of each packet of a same color may be used as compared to a threshold rather than requiring dominance of that number before an action is taken. Other examples may be ascertained by one skilled in the art. Thus, these examples as well as the preceding teachings further demonstrate the inventive scope, as is defined by the following claims.

The invention claimed is:

1. A network system, comprising:
   a first network node, comprising:
      an input for receiving packets, wherein during operation the first network node operates as a downstream node when receiving packets at the input from an upstream node;
      a buffer, coupled to the input and for storing received packets;
      circuitry for detecting when a number of packets stored in the buffer exceeds a buffer storage threshold; and
      circuitry, responsive to a detection by the circuitry for detecting that the number of packets stored in the buffer exceeds the buffer storage threshold, for issuing a message to the upstream node, wherein the message selectively commands the upstream node to either continue with transmission of packets from the upstream node to the downstream node or to reduce a rate of transmission of packets from the upstream node to the downstream node to a non-zero rate, in response to a packet drop precedence in the buffer of the downstream node relative to a packet drop precedence in at least a portion of a buffer in the upstream node.

2. The system of claim 1:
   wherein the message comprises a first message;
   wherein the buffer storage threshold comprises a first buffer storage threshold;
   wherein the circuitry for detecting further comprising circuitry for detecting when a number of packets stored in the buffer exceeds a second buffer storage threshold, wherein the second buffer storage threshold is larger than the first buffer storage threshold;
   wherein the circuitry for issuing is for, responsive to a detection by the circuitry for detecting that the number of packets stored in the buffer exceeds the second buffer storage threshold, issuing a second message to the upstream node; and
   wherein the second message commands the upstream node to cease transmission of packets from the upstream node to the downstream node.

3. The system of claim 2:
   wherein the second message commands the upstream node to cease transmission of packets from the upstream node to the downstream node for a period of time; and
   wherein the second message identifies the period of time.

4. The system of claim 3 wherein the first network node further comprises circuitry for determining the period of time in response to a rate of transmission from the buffer and a measure of packet occupancy in the buffer.

5. The system of claim 1 wherein the message identifies the non-zero rate.

6. The system of claim 5 wherein the node further comprises circuitry for determining the non-zero rate by multiplying a constant, less than one, times a rate that packets are output from the buffer at a time that the circuitry for detecting detects that the number of packets stored in the buffer exceeds the buffer storage threshold.

7. The system of claim 1:
   wherein the message comprises a first message;
   wherein the buffer storage threshold comprises a first buffer storage threshold;
   wherein the circuitry for detecting further comprises circuitry for detecting when a number of packets stored in the buffer exceeds a second buffer storage threshold, wherein the second buffer storage threshold is larger than the first buffer storage threshold;
   wherein the circuitry for issuing is for, responsive to a detection by the circuitry for detecting that the number of packets stored in the buffer exceeds the second buffer storage threshold, issuing a second message to the upstream node; and
   wherein the second message selectively commands the upstream node to either cease transmission of packets from the upstream node to the downstream node or to reduce a rate of transmission of packets from the upstream node to the downstream node to a non-zero rate, in response to a packet drop precedence in the buffer of the downstream node relative to a packet drop precedence in the at least a portion of the buffer in the upstream node.

8. The system of claim 7 wherein the at least a portion of the buffer in the upstream node comprises a number of locations in the buffer storing packets to be transmitted at the non-zero rate and during a period of time identified by the message.

9. The system of claim 7 wherein the at least a portion of the buffer in the upstream node comprises a number of locations in the buffer less than the buffer entirety.

10. The system of claim 7:
wherein the first message selectively commands the upstream node to either continue with transmission of packets from the upstream node to the downstream node or to reduce a rate of transmission of packets from the upstream node to the downstream node to a non-zero rate, in response to a packet drop precedence dominance in the buffer of the downstream node relative to a packet drop precedence dominance in at least a portion of a buffer in the upstream node; and
wherein the second message selectively commands the upstream node to either cease transmission of packets from the upstream node to the downstream node or to reduce a rate of transmission of packets from the upstream node to the downstream node to a non-zero rate, in response to a packet drop precedence dominance in the buffer of the downstream node relative to a packet drop precedence dominance in the at least a portion of the buffer in the upstream node.

11. The system of claim 10 wherein the packet drop precedence of the downstream node and of the upstream node comprises a color marked precedence.

12. The system of claim 11:
wherein the packet drop precedence of the downstream node and of the upstream node ranks packet priority, from highest to lowest, as green, yellow, and red;
wherein responsive to a red packet drop precedence dominance in the buffer in the downstream node and a red packet drop precedence dominance in the at least a portion of the buffer in the upstream node, the first message commands the upstream node to reduce a rate of transmission of packets from the upstream node to the downstream node to a non-zero rate;
wherein responsive to a red packet drop precedence dominance in the buffer in the downstream node and a drop precedence dominance other than red in the in the at least a portion of the buffer in the upstream node, the first message commands the upstream node to continue a present rate of transmission of packets from the upstream node to the downstream node;
wherein responsive to a yellow packet drop precedence dominance in the buffer of the downstream node and packets having either a red, yellow, or combined red and yellow, packet drop precedence dominance in the at least a portion of the buffer in the upstream node, the first message commands the upstream node to reduce a rate of transmission of packets from the upstream node to the downstream node to a non-zero rate;
wherein responsive to a yellow packet drop precedence dominance in the buffer of the downstream node and a drop precedence dominance in the at least a portion of the buffer in the upstream node other than red, yellow, or combined red and yellow, the first message commands the upstream node to continue a present rate of transmission of packets from the upstream node to the downstream node; and
wherein responsive to a green packet drop precedence dominance in the buffer of the downstream node, the first message commands the upstream node to reduce a rate of transmission of packets from the upstream node to the downstream node to a non-zero rate.

13. The system of claim 11:
wherein the packet drop precedence of the downstream node and of the upstream node ranks packet priority, from highest to lowest, as green, yellow, and red;
wherein responsive to a red packet drop precedence dominance in the buffer of the downstream node and a red packet drop precedence dominance in the at least a portion of the buffer in the upstream node, the second message commands the upstream node to cease transmission of packets from the upstream node to the downstream node;
wherein responsive to a red packet drop precedence dominance in the buffer of the downstream node and a drop precedence dominance other than red in the at least a portion of the buffer in the upstream node, the second message commands the upstream node to reduce a rate of transmission of packets from the upstream node to the downstream node to a non-zero rate;
wherein responsive to a yellow packet drop precedence dominance in the buffer of the downstream node and packets having either a red, yellow, or combined red and yellow, packet drop precedence dominance in the at least a portion of the buffer in the upstream node, the second message commands the upstream node to cease transmission of packets from the upstream node to the downstream node;
wherein responsive to a yellow packet drop precedence dominance in the buffer of the downstream node and a drop precedence dominance in the at least a portion of the buffer in the upstream node other than red, yellow, or combined red and yellow, the second message commands the upstream node to reduce a rate of transmission of packets from the upstream node to the downstream node to a non-zero rate; and
wherein responsive to a green packet drop precedence dominance in the buffer of the downstream node, the second message commands the upstream node to cease transmission of packets from the upstream node to the downstream node.

14. The system of claim 13:
wherein the packet drop precedence of the downstream node and of the upstream node ranks packet priority, from highest to lowest, as green, yellow, and red;
wherein responsive to a red packet drop precedence dominance in the buffer of the downstream node and a red packet drop precedence dominance in the at least a portion of the buffer in the upstream node, the first message commands the upstream node to reduce a rate of transmission of packets from the upstream node to the downstream node to a non-zero rate;
wherein responsive to a red packet drop precedence dominance in the buffer of the downstream node and a drop precedence dominance other than red in the at least a portion of the buffer in the upstream node, the first message commands the upstream node to continue a present rate of transmission of packets from the upstream node to the downstream node;

wherein responsive to a yellow packet drop precedence dominance in the buffer of the downstream node and packets having either a red, yellow, or combined red and yellow, packet drop precedence dominance in the at least a portion of the buffer in the upstream node, the first message commands the upstream node to reduce a rate of transmission of packets from the upstream node to the downstream node to a non-zero rate;

wherein responsive to a yellow packet drop precedence dominance in the buffer of the downstream node and a drop precedence dominance in the at least a portion of the buffer in the upstream node other than red, yellow, or combined red and yellow, the first message commands the upstream node to continue a present rate of transmission of packets from the upstream node to the downstream node; and wherein responsive to a green packet drop precedence dominance in the buffer of the downstream node, the first message commands the upstream node to reduce a rate of transmission of packets from the upstream node to the downstream node to a non-zero rate.

15. The system of claim 7 wherein the packet drop precedence of the downstream node and of the upstream node comprises a color marked precedence.

16. The system of claim 1 wherein the upstream node is adjacent the downstream node.

17. The system of claim 1 wherein the system further comprises the upstream node.

18. The system of claim 1:
wherein the message selectively commands the upstream node to reduce a rate of transmission of packets from the upstream node to the downstream node to a non-zero rate for a period of time; and
wherein the first network node further comprises circuitry for determining the period of time.

19. The system of claim 18:
wherein the circuitry for determining the period of time determines the period of time in response to a transmission rate of packets from the buffer and a receipt rate of packets into the buffer; and
wherein the transmission rate is greater than the receipt rate.

20. A method of operating a first network node, comprising:
receiving packets at an input of the first network node, wherein during operation the first network node operates as a downstream node when receiving packets at the input from an upstream node;
storing the received packets into a buffer;
detecting when a number of packets stored in the buffer exceeds a buffer storage threshold; and
responsive to a detecting that the number of packets stored in the buffer exceeds the buffer storage threshold, issuing a message to the upstream node, wherein the message selectively commands the upstream node to either continue with transmission of packets from the upstream node to the downstream node or to reduce a rate of transmission of packets from the upstream node to the downstream node to a non-zero rate, in response to a packet drop precedence in the buffer of the downstream node relative to a packet drop precedence in at least a portion of a buffer in the upstream node.

21. The method of claim 20:
wherein the message comprises a first message;
wherein the buffer storage threshold comprises a first buffer storage threshold;
wherein the step of detecting is further for detecting when a number of packets stored in the buffer exceeds a second buffer storage threshold, wherein the second buffer storage threshold is larger than the first buffer storage threshold;
and further comprising, responsive to detecting that the number of packets stored in the buffer exceeds the second buffer storage threshold, issuing a second message to the upstream node; and
wherein the second message commands the upstream node to cease transmission of packets from the upstream node to the downstream node.

22. The method of claim 20:
wherein the message comprises a first message;
wherein the buffer storage threshold comprises a first buffer storage threshold;
wherein the step of detecting further comprises detecting when a number of packets stored in the buffer exceeds a second buffer storage threshold, wherein the second buffer storage threshold is larger than the first buffer storage threshold;
wherein the step of issuing is for, responsive to a detection that the number of packets stored in the buffer exceeds the second buffer storage threshold, issuing a second message to the upstream node;
and
wherein the second message selectively commands the upstream node to either cease transmission of packets from the upstream node to the downstream node or to reduce a rate of transmission of packets from the upstream node to the downstream node to a non-zero rate, in response to a packet drop precedence in the buffer of the downstream node relative to a packet drop precedence in the at least a portion of the buffer in the upstream node.

23. A network system, comprising:
a first network node, comprising:
a buffer for storing packets;
circuitry for transmitting packets from the buffer, as an upstream node, to a downstream node; and
an input for receiving a message from the downstream node, wherein the circuitry for transmitting selectively reduces its rate of transmission of packets to the downstream node to a non-zero rate in response to the message and in response to a packet drop precedence in at least a portion of the buffer of the upstream node relative to a packet drop precedence in a buffer in the downstream node.

24. The system of claim 23 when the message is issued by the downstream node to the upstream node in response to the downstream node detecting that a number of packets stored in a buffer in the downstream node exceeds a buffer storage threshold associated with the buffer in the downstream node.

25. The system of claim 24:
wherein the message comprises a first message;
wherein the buffer storage threshold comprises a first buffer storage threshold;
wherein the input is further for receiving a second message from the downstream node, wherein the circuitry for transmitting selectively ceases its rate of transmission of packets from the upstream node to the downstream node in response to the second message.

26. The system of claim 25 wherein the wherein the circuitry for transmitting selectively ceases its rate of transmission of packets from the upstream node to the downstream node in response to the second message and in response to a packet drop precedence in at least a portion of the buffer of the upstream node relative to a packet drop precedence in a buffer in the downstream node.

27. The system of claim 25 wherein the second message is issued by the downstream node when a number of packets stored in the buffer of the downstream node exceeds a second buffer storage threshold, wherein the second buffer storage threshold is larger than the first buffer storage threshold.

28. The system of claim 23 wherein the packet drop precedence of the downstream node and of the upstream node comprises a color marked precedence.

29. A method of operating a first network node, comprising:
storing packets in a buffer;
transmitting packets from the buffer, as an upstream node, to a downstream node; and
receiving a message from the downstream node, wherein the step of transmitting includes selectively reducing its rate of transmission of packets from the upstream node to the downstream node to a non-zero rate in response to the message and in response to a packet drop precedence in at least a portion of the buffer of the upstream node relative to a packet drop precedence in a buffer in the downstream node.

30. The method of claim 29 when the message is issued by the downstream node to the upstream node in response to the downstream node detecting that a number of packets stored in a buffer in the downstream node exceeds a buffer storage threshold associated with the buffer in the downstream node.

31. The method of claim 30:
wherein the message comprises a first message;
wherein the buffer storage threshold comprises a first buffer storage threshold;
and further comprising receiving a second message from the downstream node, wherein the step of transmitting ceases its transmission of packets from the upstream node to the downstream node in response to the second message.

32. The method of claim 31 wherein the second message is issued by the downstream node when a number of packets stored in the buffer of the downstream node exceeds a second buffer storage threshold, wherein the second buffer storage threshold is larger than the first buffer storage threshold.

33. The method of claim 31 wherein the step of transmitting ceases its transmission of packets from the upstream node to the downstream node in response to the second message and in response to a packet drop precedence in at least a portion of the buffer of the upstream node relative to a packet drop precedence in a buffer in the downstream node.

34. The method of claim 29 wherein the packet drop precedence of the downstream node and of the upstream node comprises a color marked precedence.

* * * * *